United States Patent
Sasaki et al.

(10) Patent No.: US 8,588,388 B2
(45) Date of Patent: Nov. 19, 2013

(54) TELEPHONE SYSTEM AND SERVER APPARATUS AND CONTROL METHOD USED IN TELEPHONE SYSTEM

(75) Inventors: Yasumasa Sasaki, Tachikawa (JP); Motohisa Araki, Akishima (JP); Toshio Nishida, Hino (JP); Yoshimitsu Ebisawa, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/370,160

(22) Filed: Feb. 9, 2012

(65) Prior Publication Data

US 2012/0307994 A1    Dec. 6, 2012

(30) Foreign Application Priority Data

May 31, 2011   (JP) .................................. 2011-122673

(51) Int. Cl.
*H04M 1/00*   (2006.01)
*H04M 15/00*   (2006.01)
*H04M 7/00*   (2006.01)

(52) U.S. Cl.
USPC .................. 379/165; 379/112.02; 379/221.04

(58) Field of Classification Search
USPC ......... 379/156, 165, 112.02, 221.04; 370/352
See application file for complete search history.

(56) References Cited

U.S. PATENT DOCUMENTS

| | | | |
|---|---|---|---|
| 7,203,965 B2 | 4/2007 | Lakamp et al. | |
| 2005/0180317 A1* | 8/2005 | Shimada | 370/217 |
| 2006/0282535 A1* | 12/2006 | Matsukawa et al. | 709/225 |
| 2007/0071202 A1* | 3/2007 | Sasaki et al. | 379/158 |
| 2007/0121862 A1* | 5/2007 | Fuse | 379/161 |
| 2007/0230333 A1* | 10/2007 | Kakiuchi | 370/217 |
| 2009/0150523 A1* | 6/2009 | Gray et al. | 709/220 |
| 2009/0216830 A1* | 8/2009 | Inoue et al. | 709/201 |
| 2010/0161745 A1* | 6/2010 | Yamazaki et al. | 709/206 |

FOREIGN PATENT DOCUMENTS

| | | |
|---|---|---|
| JP | 2002-297254 | 10/2002 |
| JP | 2004-295846 | 10/2004 |
| JP | 2006-521713 | 9/2006 |
| JP | 4332344 | 6/2009 |

* cited by examiner

*Primary Examiner* — Quoc D Tran
(74) *Attorney, Agent, or Firm* — Blakely, Sokoloff, Taylor & Zafman LLP

(57) ABSTRACT

According to one embodiment, a telephone system includes a plurality of telephone terminals, a first server apparatus and a second server apparatus. The first server apparatus includes a license authentication module and a transmission controller. The license authentication module performs license authentication by comparing a terminal ID included in a registration request with a terminal ID stored in the license memory. The transmission controller reads from the license memory a license authentication code corresponding to a telephone terminal, and transmits to the telephone terminal a license authentication code added check information.

15 Claims, 10 Drawing Sheets

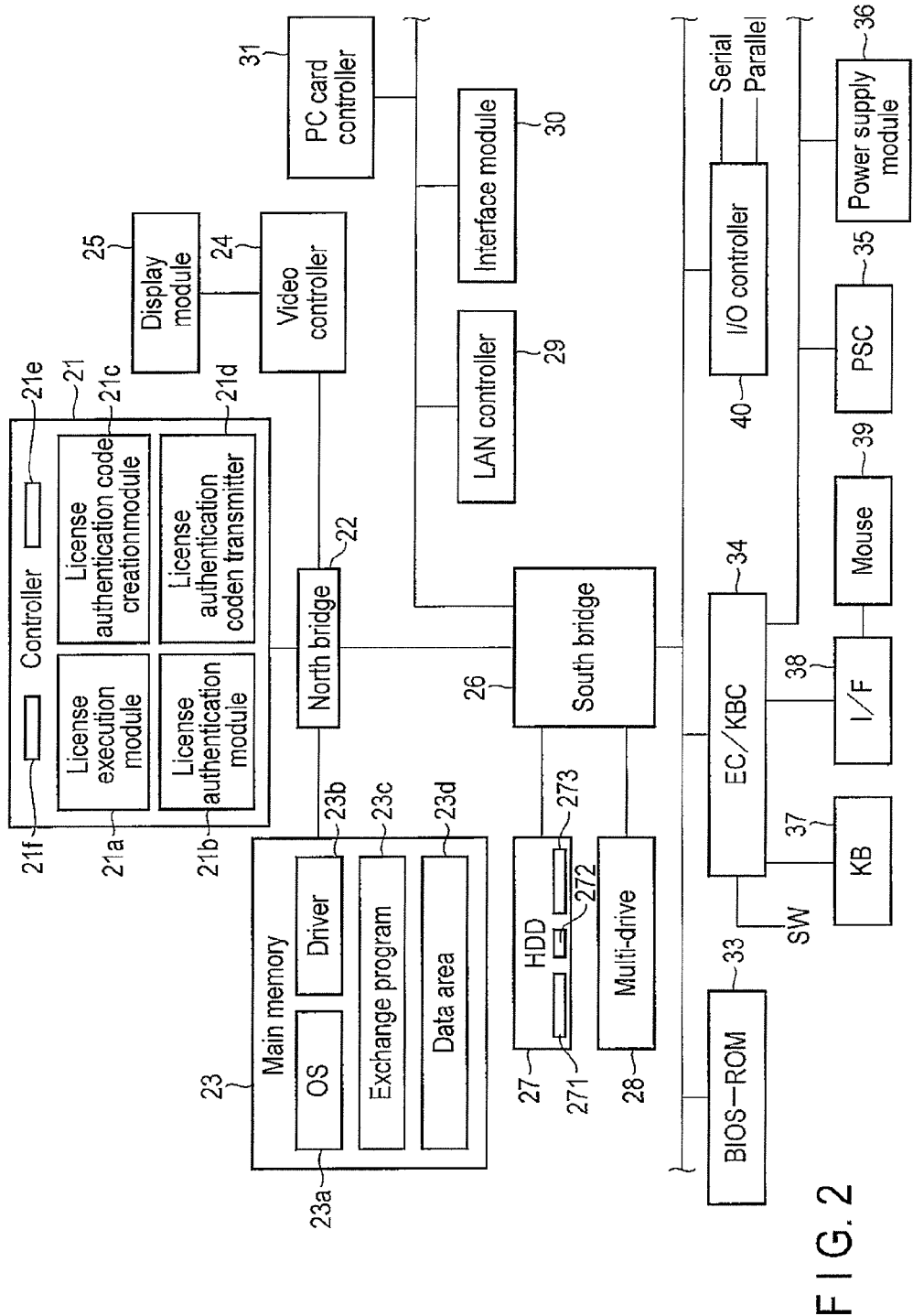
F I G. 2

| Terminal identifier | License information (system ID) | |
|---|---|---|
| 2000 | Present | 12345 |
| 2001 | Present | 6789X |
| 2002 | Present | 0123Y |
| ⋮ | ⋮ | |

F I G. 3

| System ID | 0123Y | |
|---|---|---|
| System ID | | 12345 |
| Number of lines | | 300 |
| Load | | 50% |
| Use limitation | | 50% |
| Service start enable/disable flag | | |
| | Call-Pickup function | Usable |
| | Call-Forward function | Unusable |
| | ACD login function | Usable |
| | ⋮ | ⋮ |
| Command execution able/disable flag | | |
| | Multi-appearance function | Usable |
| | System mode automatic switching function | Unusable |
| | Extension representative function | Unusable |
| | External line outgoing function | Usable |
| | Teleconference function | Unusable |
| | ⋮ | ⋮ |
| Terminal usable/unusable flag by type | | |
| | Conference apparatus | Usable |
| | Voice mail apparatus (VM) | Usable |
| | Attendant console (ATT) | Unusable |
| | ⋮ | ⋮ |
| Port usable/unusable flag | | |
| | Port number | Type | Unusable |
| | 1 | SLT | Usable |
| | 2 | DKT | Unusable |
| | 3 | ISDN | Usable |
| | 4 | Basic | Usable |
| | 5 | Basic | Usable |
| | 6 | Primary | Unusable |
| | 7 | VM | Usable |
| | 8 | ATT | Usable |
| | 9 | ATT | Usable |
| | ⋮ | ⋮ | ⋮ |
| | 300 | SLT | Usable |
| | 301 | SLT | Unusable |
| | 302 | SLT | Unusable |

F I G. 4

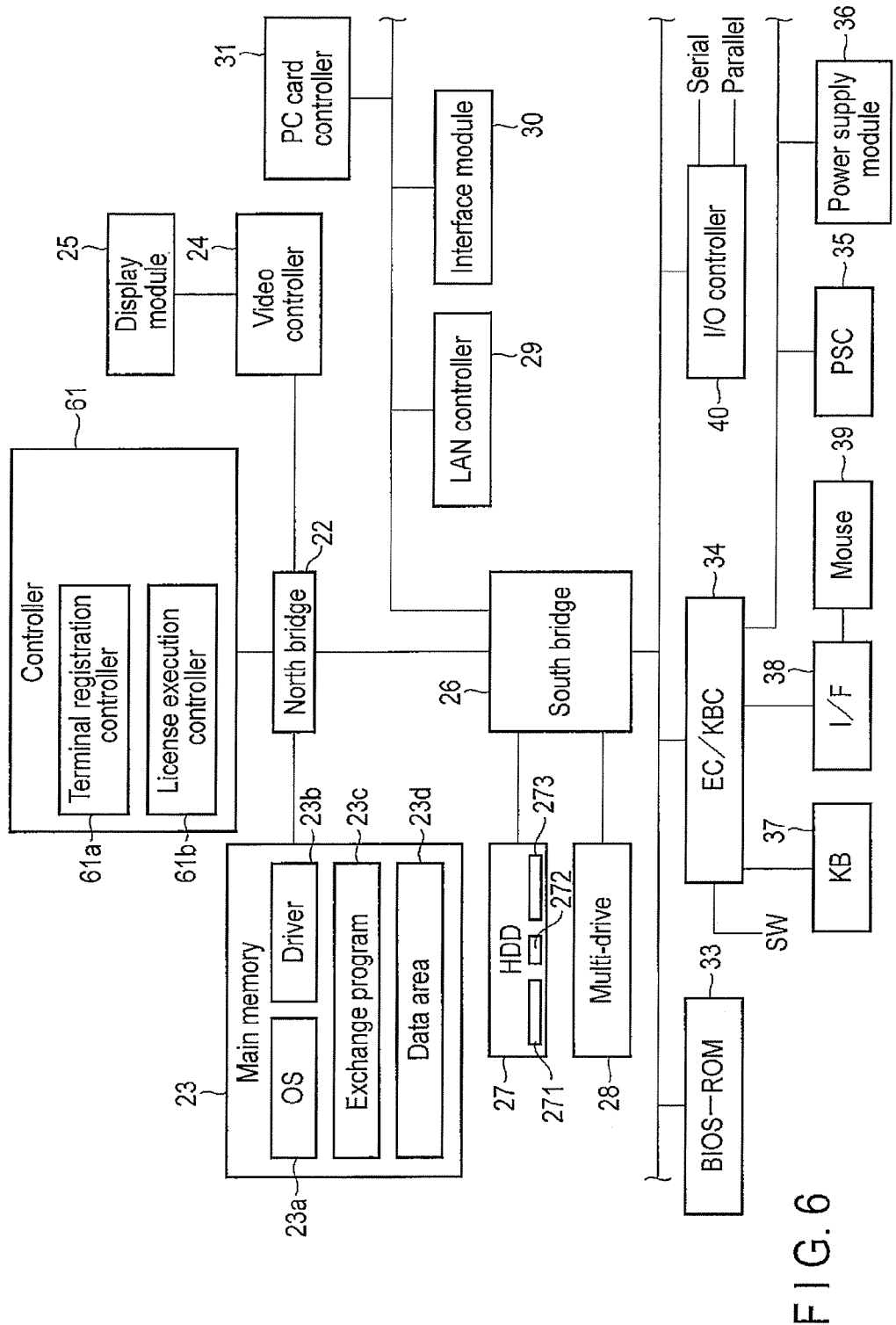
F I G. 6

FIG. 8

| License authentication basic information | Issue time information |

FIG. 9

| License authentication basic information | Issue time information | License validity period information |

FIG. 10

| License authentication basic information | Expiration time information |

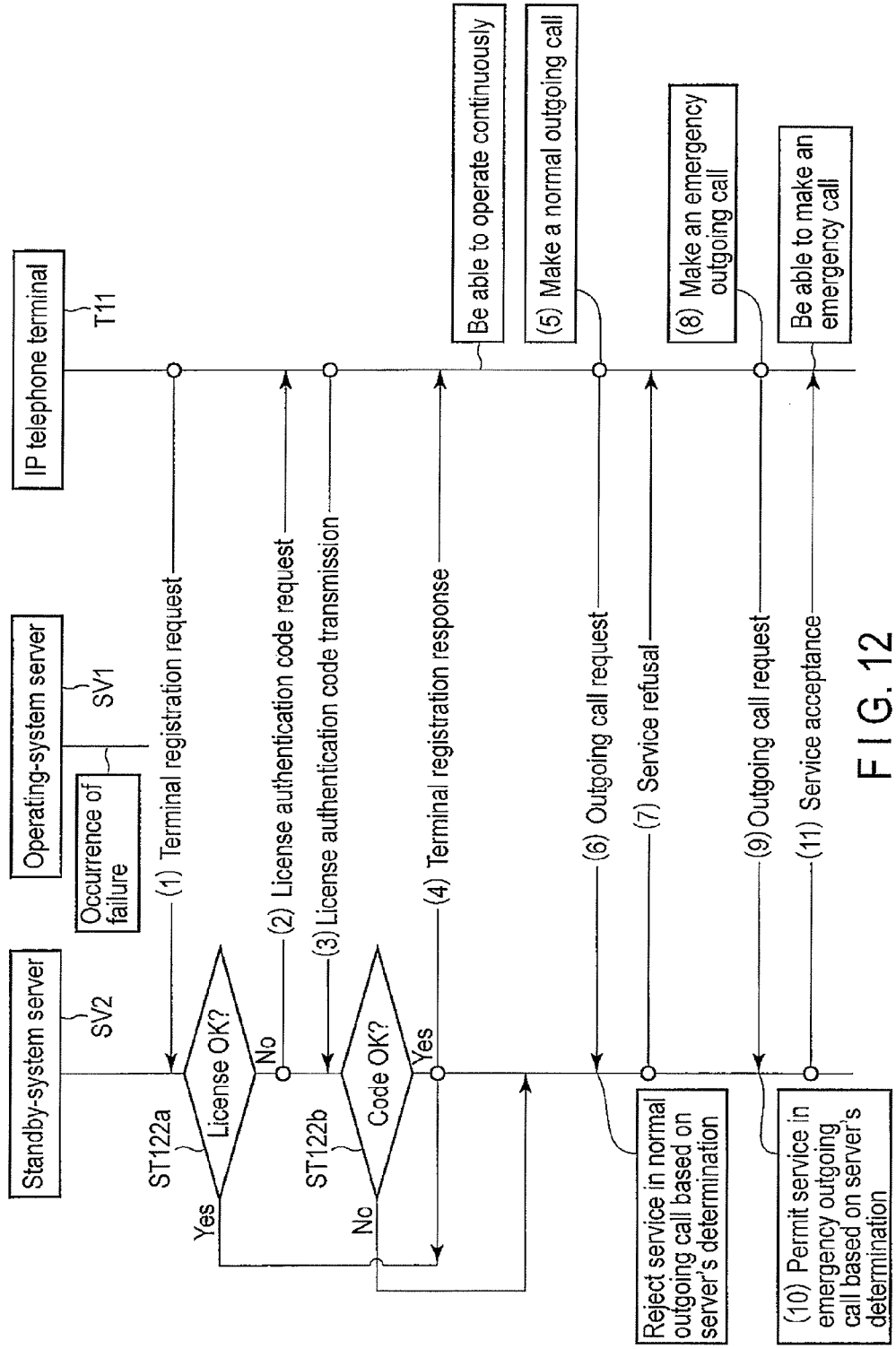
F I G. 12

TELEPHONE SYSTEM AND SERVER APPARATUS AND CONTROL METHOD USED IN TELEPHONE SYSTEM

CROSS-REFERENCE TO RELATED APPLICATIONS

This application is based upon and claims the benefit of priority from prior Japanese Patent Application No. 2011-122673, filed May 31, 2011, the entire contents of which are incorporated herein by reference.

FIELD

Embodiments described herein relate generally to a telephone system which executes exchange processing between the enabling and disabling of a function or a hardware circuit according to a license authentication code and a server apparatus and a control method used in a telephone system.

BACKGROUND

In recent years, an IP telephone system has been popularized which transmits and receives images and sound in the form of packet data bidirectionally in real time via an IP network. In the IP telephone system, not only can each of the server apparatuses connected to the IP network make an extension-to-extension call or an incoming or outgoing call, but also an extension-to-extension call or an incoming or outgoing call can be made between server apparatuses via the IP network.

In the IP telephone system, an IP telephone terminal function may have to be added or an unnecessary IP telephone terminal have to be removed according to the increase of personnel, a change of the business content, or the like in a department in which a server apparatus has been installed. In such a case, a conventional system has generally used a function providing method of incorporating functions beforehand and permitting a part or all of the functions to be used by inputting a license authentication code. In addition, it is common practice to place or lift restrictions on the use of functions in terms of capacity, such as the number of terminals that can use the functions or the memory capacity available in using a function, based on a license authentication code.

Furthermore, in the IP telephone system, IP telephone terminals are registered in individual server apparatuses on an IP network beforehand. When the user makes a call from his or her IP telephone terminal by use of an IP network, the server apparatus authenticates the license of an IP telephone terminal.

With the IP telephone system, to use an IP telephone terminal, the user must register the license of the terminal in a server apparatus. Therefore, in the IP telephone system using a redundant configuration of the server apparatuses, the user must register the license in an operating-system server apparatus and in a standby-system server separately in advance. In addition, it is necessary to prepare a third server apparatus to perform license authenticate without being affected by the driving situation of the operating system and standby system. Moreover, in the standby system, it is necessary to give unqualified approval to an IP telephone terminal that requests registration in the server.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 2 is a block diagram showing a configuration of the operating-system server shown in FIG. 1;

FIG. 3 shows an example of the stored contents of the license information table shown in FIG. 2;

FIG. 4 shows an example of the stored contents of the service execution table shown in FIG. 2;

FIG. 6 is a block diagram showing a configuration of the standby-system server shown in FIG. 1;

FIG. 8 shows an example of a transmission format of a license authentication code to which issue time information has been added;

FIG. 9 shows an example of a transmission format of a license authentication code to which issue time information and license validity period information have been added;

FIG. 10 shows an example of a transmission format of a license authentication code to which license validity period information has been added;

FIG. 12 shows a sequence to explain the operation of transmitting and receiving information between the operating-system server, the standby-system server, and an IP telephone terminal in registering a terminal in the second embodiment.

DETAILED DESCRIPTION

Figure 1:
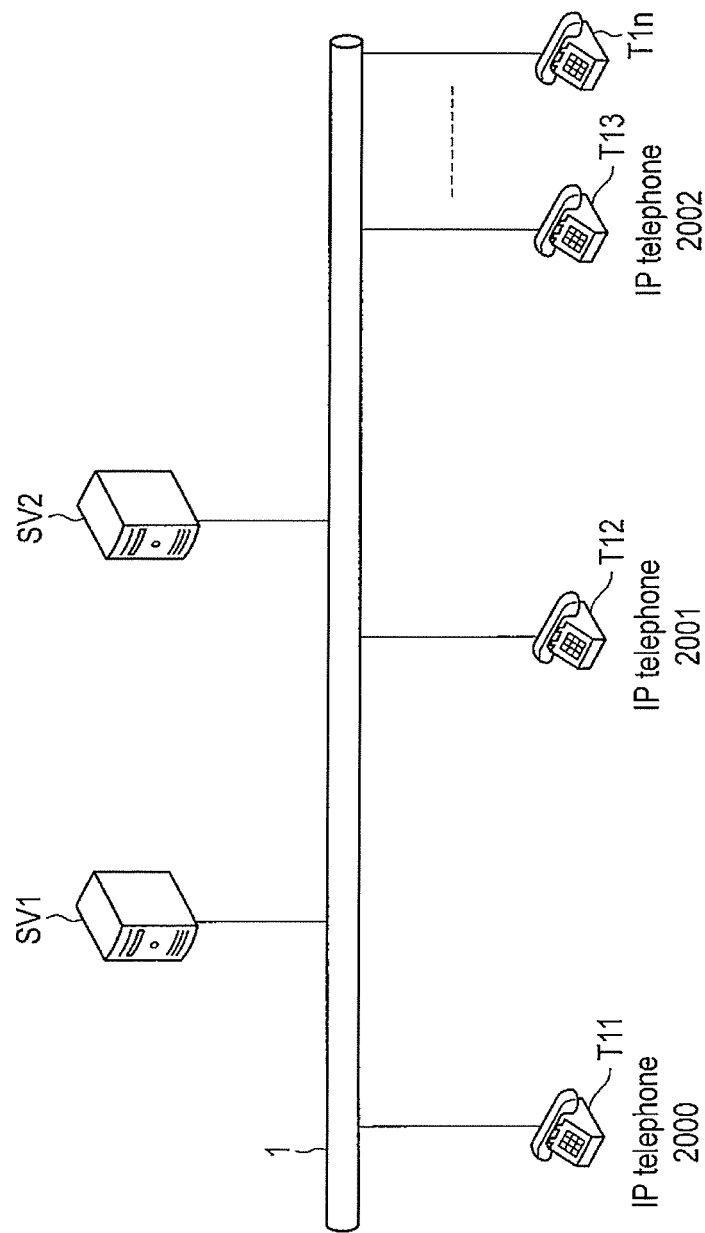
FIG. 1 shows a schematic configuration of an IP telephone system according to a first embodiment.

Various embodiments will be described hereinafter with reference to the accompanying drawings. In general, according to one embodiment, a telephone system includes a plurality of telephone terminals, a first server apparatus and a second server apparatus. The first server apparatus registers the telephone terminals. The second server apparatus functions as a standby system for the first server apparatus. The first server apparatus includes a license memory, a license setting module, a license authentication module, and a transmission controller. The license memory stores a terminal ID in association with a license authentication code, wherein the terminal ID corresponds with the telephone terminal, wherein the license authentication code is code for permitting the use of at least one of a plurality of functions or a plurality of hardware circuits or for expanding a capacity, wherein the plurality functions or a plurality of hardware circuits are concerned with exchange processing between the telephone terminals. The license setting module sets a corresponding function or hardware circuit to be usable/unusable in the telephone terminal based on the license authentication code stored in the license memory. The license authentication module performs license authentication by comparing a terminal ID included in a registration request with a terminal ID stored in the license memory when the registration request is transmitted from any one of the telephone terminals. The transmission controller reads from the license memory a license authentication code corresponding to a telephone terminal whose terminal ID coincides with that stored in the license memory, and transmits to the telephone terminal a license authentication code added check information, wherein the check information is information for checking that the code is valid. The telephone terminal includes an authentication code memory and a server switching controller. The authentication code memory stores check information and a license authentication code sent from the first server apparatus. The server switching controller transmits to the second server apparatus a registration request and a license authentication code and check information stored in the authentication code memory when a failure has occurred in the first server apparatus in which the telephone terminal is registered. The second server apparatus includes a registration controller and a service controller. The registration controller stores in a management table the terminal ID in association with the license authentication code or rejects the storing in the management table the terminal ID in association with the license authentication code based on the check information added to the license authentication code sent from the telephone terminal when the telephone terminal send a registration request. The service controller sets a corresponding function or hardware circuit usable/unusable in the telephone terminal based on a license authentication code stored in the management table.

First Embodiment

A first embodiment is such that an operating-system server, when issuing a license authentication code to an IP telephone terminal, adds information for checking that the code is valid to the license authentication code and that a standby-system server checks a license authentication code sent from an IP telephone terminal requesting registration based on check information and, if the terminal is valid, registers it and, if the terminal is invalid, rejects registration.

FIG. 1 shows a schematic configuration of an IP telephone system according to the first embodiment.

The IP telephone system comprises an IP network 1. An operating-system server SV1 and a standby-system server SV2 are connected to the IP network 1. A plurality of IP telephone terminals T11 to T1n (n being a natural number) are registered in the operating-system server SV1 via the IP network 1. Each of IP telephone terminals T11 to T1n has a call processing function and a processing media information processing function, including images.

The operating-system server SV1 has a switching control function of establishing a session between IP telephone terminals T11 to T1n or between IP telephone terminals T11 to T1n and a public network (not shown) according to, for example, SIP. After the establishment of the session, IP packets are transmitted and received between a IP telephone terminal on the outgoing side and that on the incoming side by peer-to-peer connection, performing audio communication.

In addition, the operating-system server SV1 has not only the function for making a exchange connection between IP telephone terminals T11 to T1n and between IP telephone terminals T11 to T1n and subscriber lines of the public network according to incoming and outgoing calls as a basic service function but also a plurality of optional service functions related to the exchange connection process. The optional service functions include, for example, a call pickup function, a call forwarding function, and a multi-appearance function.

Furthermore, the operating-system server SV1 has the function for sending a license authentication code to IP telephone terminals T11 to T1n to additionally set a function or a hardware circuit or to limit the use of them. In the license authentication code, an instruction code to make a function or a hardware circuit active or an instruction code to increase the memory capacity and a system ID are inserted.

FIG. 2 is a block diagram showing a configuration of the operating-system server SV1.

The operating-system server SV1 comprises a controller 21, a north bridge 22, a main memory 23, a video controller 24, a display module 25, a south bridge 26, a hard disk drive (HDD) 27, a multi-drive 28, a LAN controller 29, an interface module 30, a PC card controller 31, a BIOS-ROM (Basic Input/Output System ROM) 33, EC/KBC (Embedded Controller/Keyboard Controller) 34, a power controller (PSC) 35, a power supply module 36, a keyboard (KB) 37, a mouse interface (I/F) 38, a mouse 39, and an I/O controller 40.

The controller 21, which is chiefly composed of a CPU (Central Processing Unit), supervises overall control of the operating-system server SV1. Using the main memory 23 as a work area, the controller 21 executes an operating system (OS) 23a, a driver 23b, a exchange program 23c, and others loaded from the HDD 27 into the main memory 23.

The north bridge 22 includes various controllers that perform a bridging process between the controller 21 and south bridge 26, control of the main memory 23, control of the video controller 24, and others.

The video controller 24, which is connected to the north bridge 22 via an accelerated graphics port (AGP), performs control of data to be displayed on the display module 25. The display module 25, which includes a liquid-crystal display (LCD), displays data sent from the video controller 24 on the screen.

The south bridge 26, which is connected to the north bridge 22 via a hub link, includes various controllers that perform control of various devices (including the EC/KBC 34 and I/O controller) on an LPC (Low Pin Count) bus, various PCI devices (including the LAN controller 29, interface module 30, and PC card controller 31) on a PCI (Peripheral Component Interconnect) bus, a disk drive compatible with IDE (Integrated Drive Electronics), a USB device, and others.

The HDD 27, which is connected as a device compatible with primary IDE to the south bridge 26, is a built-in hard disk that stores various programs, including an OS and a exchange program, and various data items 23d. The multi-drive 28, which is connected as a device compatible with a secondary IDE to the south bridge 26, drives a CD-ROM, a DVD-ROM, or a CD-R/RW which is a removable recording medium.

The LAN controller 29, which is connected as a PCI device to the south bridge 26, has a communication function conforming to the specification of wired LANs and communicates with a communication apparatus that has the same communication function.

The interface module 30, which is connected as a PCI device to the south bridge 26, has a communication function conforming to the specification of the IP network 1 and performs processing in connection with the transmission and reception of IP packets.

The PC card controller 31, which is connected as a PCI device to the south bridge 26, conforms to the PCMCIA (Personal Computer Memory Card International Association) specification and controls various PC cards. The BIOS-ROM 33, which is connected to an LPC bus, stores a BIOS (Basic Input/Output System) that mainly performs the setting of the hardware of the operating-system server SV1 when the power supply is turned on. The EC/KBC 34, which is connected to the LPC bus, controls the power controller 35 and an input device, such as the keyboard 37. The EC/KBC 34 is such that an embedded controller (EC) and a keyboard controller are integrally formed.

The power controller 35, which is connected to the EC/KBC 34 via an I2C bus, controls a voltage supplied to various parts of the operating-system server SV1. The power supply module 36 generates driving power and supplies the power to various parts of the operating-system server SV1. The keyboard 37, which is connected to the EC/KBC 34, informs the KBC of an input signal corresponding to the depression of each of the various keys. The mouse interface 38 interfaces a signal between the mouse 39 and the EC/KBC 34. The mouse 39, which is connected to the mouse interface 38, inputs signal by clicking. The I/O controller 40, which is connected to the LPC bus, performs input/output control of a serial signal or a parallel signal from/to the outside and further input/output control from/to the mouse 39.

In the operating-system server SV1, the exchange program 23c expanded over the main memory 23 cooperates with the LAN controller 29 and the like under the control of the controller 21, thereby realizing a predetermined exchange function. The operating-system server SV1 loads the exchange program 23c into a general-purpose computer server and causes this server to execute the program, thereby realizing the exchange function between telephone terminals. Like a general-purpose computer, the operating-system server SV1 uses a virtual memory system that makes a memory region in which data has been stored seem continuous from the viewpoint of software (such as processing) even if the region is physically discontinuous.

The controller 21 comprises a license execution module 21a, a licenser authentication module 21b, a license authentication code creation module 21c (hereinafter, referred to as the creation module 21c), a license authentication code transmitter 21d (hereinafter, referred to as the transmitter 21d), a terminal registration controller 21e, and a service controller 21f.

In the initial terminal registration, the license execution module 21a causes terminal identifiers identifying IP telephone terminals T11 to T1n and system IDs in the license authentication codes to correspond to one another and stores them in a license information table 271 of the HDD 27. As shown in FIG. 3, the license information table 271 is a table that causes terminal identifiers serving as the telephone numbers of IP telephone terminals T11 to T1n, information indicating the presence/absence of license information, and system IDs to correspond to one another.

When, for example, a request for use of "Voice mail apparatus" has arrived from registered IP telephone terminal T11, the license execution module 21a retrieves system ID "12345" corresponding to terminal identifier "2000" with reference to the license table 271 and refers to a service execution table 272 using system ID "12345" as a key to determine whether "Voice mail apparatus" has been set to "Usable." If it has been set to "Usable," use of "Voice mail apparatus" is permitted.

As shown in FIG. 4, the service execution table 272, which is a table for managing the setting state of optional services on a system ID basis, stores flags indicating usable or unusable so as to correspond to the individual optional service functions. If the usable/unusable flag is set to "Usable," the corresponding function can be executed. If the flag is set to "Unusable," the corresponding function cannot be executed. The memory capacity can be increased by up to 50%.

When any one of IP telephone terminals T11 to T1n has sent a registration request, the license authentication module 21b performs license authentication by comparing the terminal identifier included in the registration request with the terminal identifier stored in the license information table 271.

The creation module 21c creates a corresponding license authentication code from the service execution table 272 for, for example, IP telephone terminal T11 whose terminal identifier coincides with that stored in the license information table at the license authentication module 21b. Then, the creation module 21c adds pieces of check information, including issue time information for checking that the code is valid and validity period information, to the license authentication code.

The transmitter 21d transmits the check-information-added license authentication code to IP telephone terminal T11 that has requested registration.

The terminal registration controller 21e transmits a license authentication code request to, for example, IP telephone terminal T14 whose terminal identifier does not coincide with that stored in the license information table at the license authentication module 21b. When a license authentication code has been sent in response to the request and it has been determined that the code is valid, the terminal registration controller 21e causes the terminal identifier of IP telephone terminal T14 and the system ID included in the license authentication code to correspond to each other and stores them in the terminal registration table 273. When a license authentication code is not transmitted in response to the request even if a specific time has elapsed, or when the sent license authentication code is not acceptable, the terminal registration controller 21e transmits to IP telephone terminal T14 a message to the effect that registration cannot be accepted.

When a request for use of "Videoconference" has arrived from IP telephone terminal T14 not registered in the license information table 271, the service controller 21f refers to the system ID corresponding to the terminal identifier of IP telephone terminal T14 in the terminal registration table 273 and determines whether "Videoconference" has been set to "Usable." If it has been set to "Usable," the service controller 21f permits the use of "Videoconference."

Figure 5:
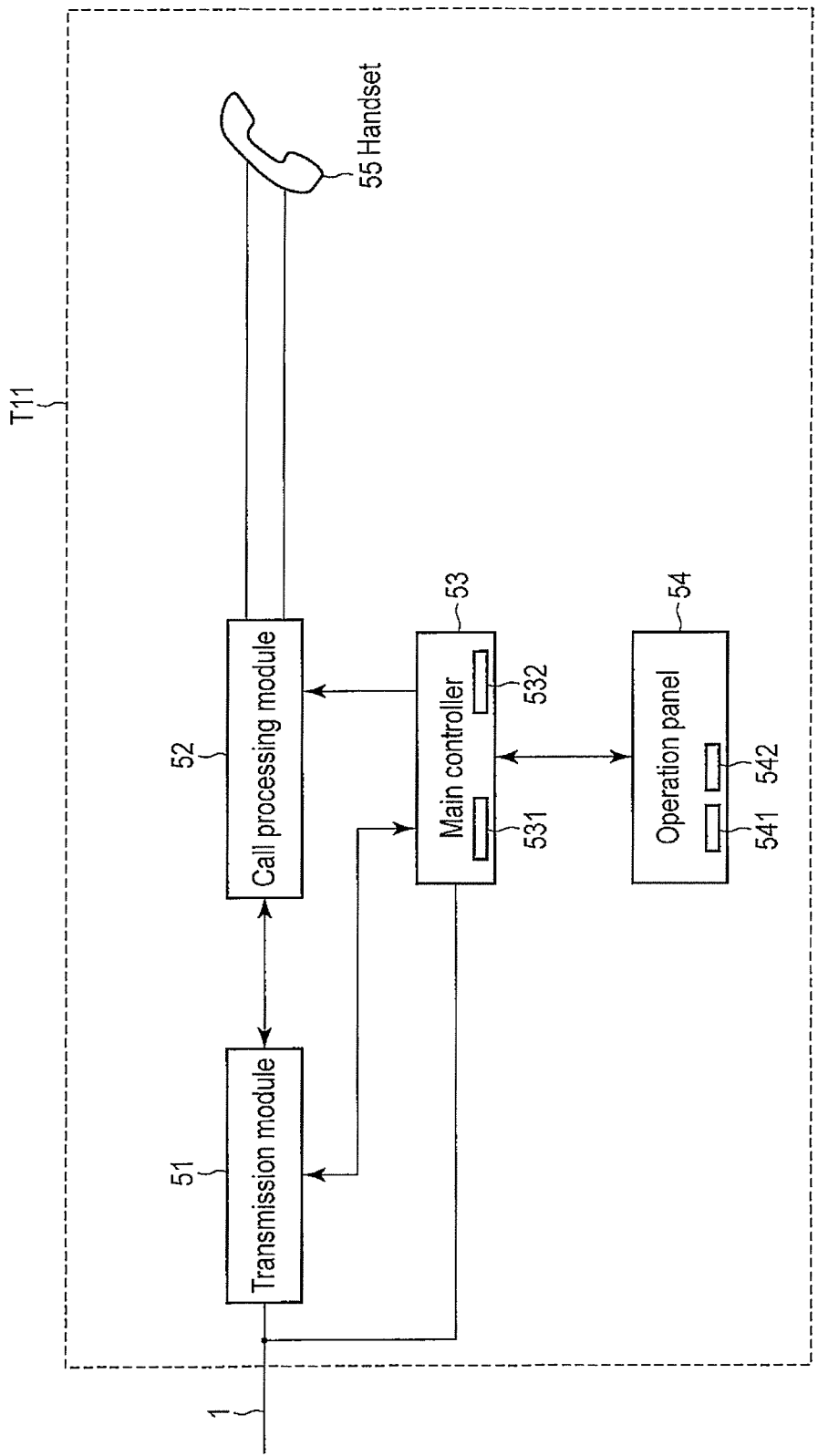
FIG. 5 is a block diagram showing a functional configuration of the IP telephone terminal shown in FIG. 1.

FIG. 5 is a block diagram showing a functional configuration of each of IP telephone terminals T11 to T1n. IP telephone terminal T11 will be explained as the representative of the rest.

In FIG. 5, IP telephone terminal T11 comprises a transmission module 51, a call processing module 52, a main controller 53, an operation panel module 54, and a handset 55.

The transmission module 51 transmits and receives various data item to and from external devices. In addition, the transmission module 51 extracts call signals and control signals from IP packets sent from external devices and supplies the call signals to the call processing module 52 and the control signals to the main controller 53. Moreover, the transmission module 51 subjects serial data signals supplied from the call processing module 52 and controller 53 to time-division multiplex to create IP packets and transmits the packets to the IP network 1.

The call processing module 52 extracts call data included in a call signal supplied from the transmission module 51 and reproduces an analog receiver voice signal from the call data. Then, the call processing module 52 drives the earpiece of the handset 55 by the reproduced receiver voice signal to output a receiver voice. In addition, an analog transmitter voice signal generated by the transmitter of the handset 55 is input to the call processing module 52. The call processing module 52 converts the transmitter voice signal to a call signal in a specific form and supplies the resulting signal to the transmission module 51.

The main controller 53, which is composed of a CPU, a ROM, and a RAM, controls various parts of IP telephone terminal T11 by software processing.

The operation panel module 54 comprises a display module 541, such as a liquid-crystal display (LCD), and a key input module 542. On the display module 541, various pieces of information showing the operating state of this apparatus output from the main controller 53, a telephone directory, and others are also displayed.

The main controller 53 comprises a license authentication code storage module 531 and a server switching controller 532. The license authentication code storage module 531 stores license authentication codes and check information sent from the operating-system server SV1.

The server switching controller 532 transmits a registration request and the license authentication code and check information stored in the license authentication code storage module 531 to the standby-system server SV2 when a failure has occurred in the operating-system server SV1 in which the IP telephone terminal has been registered.

FIG. 6 is a block diagram showing a configuration of the standby-system server SV2. In FIG. 6, the same parts as those of FIG. 2 are indicated by the same reference numerals and a detailed explanation will be omitted.

A controller 61 of the standby-system server SV2 comprises a terminal registration controller 61a and a license execution controller 61b.

For example, when IP telephone terminal T11 has sent a registration request, the terminal registration controller 61a compares the terminal identifier included in the registration request with the terminal identifier stored in the license information table 271, thereby performing license authentication. In this case, terminal identifier "2000" of IP telephone terminal T11 has not been registered in the license information table 271, a license authentication code request is transmitted. When a license authentication code has been sent in response to the request and it has been determined that the code is valid, the terminal identifier of IP telephone terminal T11 and the system ID included in the license authentication code are stored in the terminal registration table 273 so as to correspond to each other. When a license authentication code has not been sent in response to the request even if a specific time has elapsed, or when the sent license authentication code is invalid, the terminal registration controller 61a transmits to IP telephone terminal T11 a message to the effect that registration cannot be accepted.

When, for example, a request for use of "Voice mail apparatus" has arrived from IP telephone terminal T11, the license execution controller 61b refers to system ID "12345" corresponding to terminal identifier "2000" of IP telephone terminal T11 stored in the terminal registration table 273 and further refers to the service execution table 272 using the system ID as a key to determine whether "Voice mail apparatus" has been set to "Usable." If it has been set to "Usable," use of "Voice mail apparatus" is permitted.

Next, the operation of the above configuration will be explained.

Figure 7:
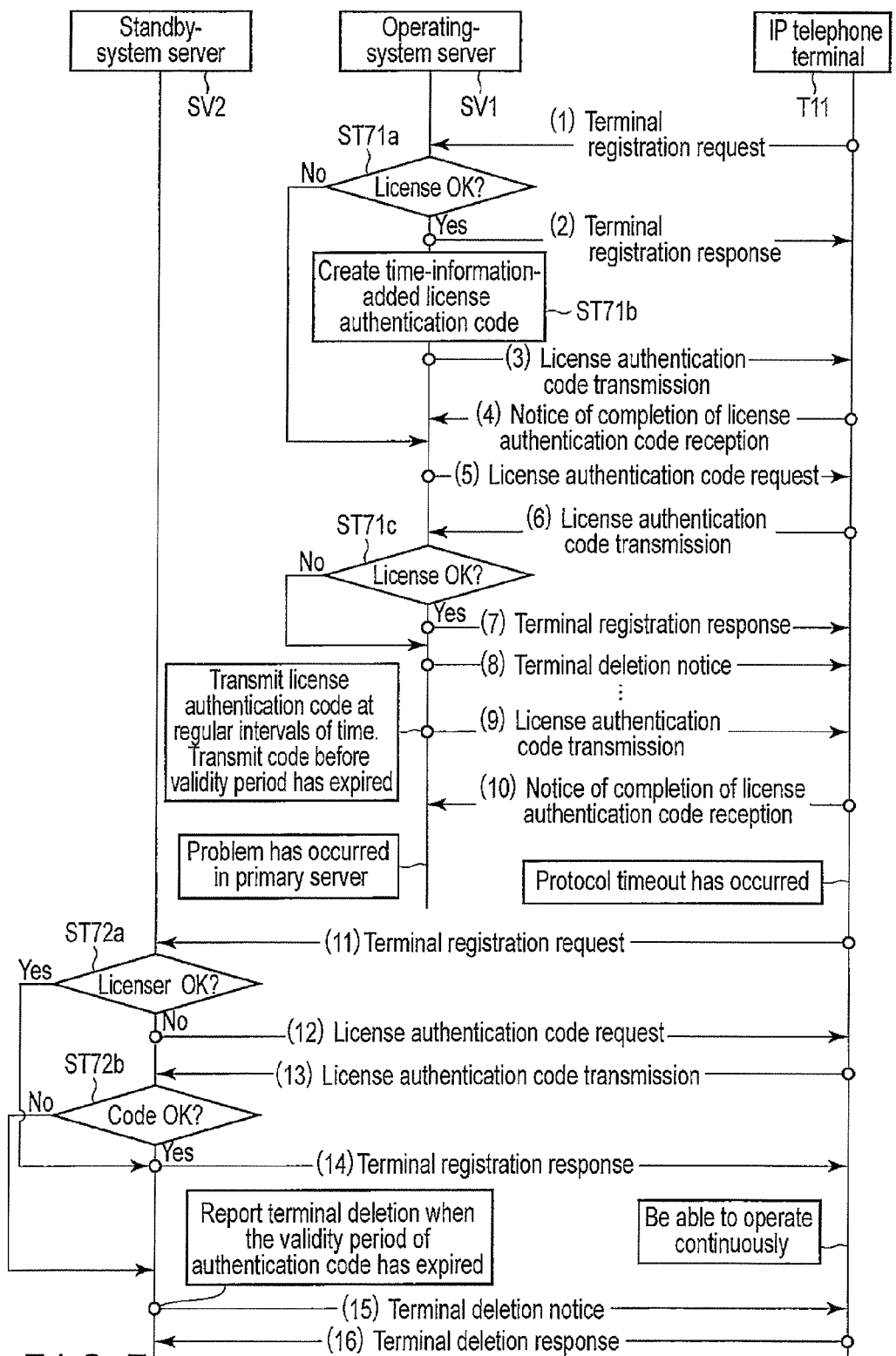
FIG. 7 shows a sequence to explain the operation of transmitting and receiving information between the operating-system server, the standby-system server, and an IP telephone terminal in registering a terminal in the first embodiment.

FIG. 7 shows a sequence to explain the operation of transmitting and receiving information between the operating-system server SV1, the standby-system server SV2, and IP telephone terminal T11 in registering a terminal.

When an initial registration process is performed between IP telephone terminal T11 and the operating-system server SV1, it is necessary to purchase a license in advance and register license information in the service execution table 272 of the operating-system server SV1 in such a manner that the license information is caused to correspond to the system ID.

At this time, the terminal identifier of IP telephone terminal T11 and the system ID in the license information are registered in the service information table 271 in such a manner that the terminal identifier and the system ID are caused to correspond to each other.

In the case of SIP, at the time of startup, IP telephone terminal T11 transmits a REGISTER message, or a "terminal registration request" signal, to the operating-system server SV1 at regular intervals (FIG. 7 (1)). Having received the REGISTER message, the operating-system server SV1 registers the terminal identifier included in the REGISTER message in the license information table 271 of the HDD 27. For example, if IP telephone terminal T14 does not transmit a REGISTER message at regular intervals, the operating-system server SV1 recognizes that IP telephone terminal T14 does not exist, with the result that IP telephone terminal T14 cannot communicate.

When having received a REGISTER message from IP telephone terminal T11, the operating-system server SV1 determines whether the terminal identifier included in the REGISTER message coincides with the terminal identifier in the license information table 271 (block ST71a). If the former coincides with the latter (Yes), the operating-system server SV1 sends back ACK, or a "terminal registration response" signal, to IP telephone terminal T11 (FIG. 7 (2)).

Furthermore, as shown in FIG. 8, the operating-system server SV1 not only creates a license authentication code by combining an instruction code for making active a function or a hardware circuit corresponding to system ID "12345" in the service execution table 272 with the system ID, but also adds issue time information corresponding to the registration time of IP telephone terminal T11 to the license authentication code (block ST71b). Then, the operating-system server SV1 transmits the issue-time-information-added license authentication code to IP telephone terminal T11 (FIG. 7 (3)).

IP telephone terminal T11 stores the license authentication code and issue time information sent from the operating-system server SV1 into the license authentication code storage module 531 and informs the operating-system server SV1 of the completion of the license authentication code reception (FIG. (4)). This completes the registration of IP telephone terminal T11 in the operating-system server SV1.

If in block ST71a, the terminal identifier included in the REGISTER message does not coincide with the terminal identifier in the license information table 271 (No), the operating-system server SV1 transmits a license authentication code request to IP telephone terminal T11 that has requested registration (FIG. 7 (5)). If in response to this request, IP telephone terminal T11 has sent an issue-time-information-added license authentication code (FIG. 7 (6)), the operating-system server SV1 checks whether the issue time has exceeded a predetermined time (block ST71c). If the issue time has not exceeded the predetermined time (Yes), the operating-system server SV1 causes the terminal identifier of IP telephone terminal T11 and the system ID included in the license authentication code to correspond to each other and registers them in the terminal registration table 273 and sends back ACK, or a "terminal registration response" signal, to IP telephone terminal T11 (FIG. 7 (7)).

In block ST71c, if a license authentication code has not been sent in response to the request even when a predetermined time has elapsed, or if the issue time of the sent license authentication code has exceeded a predetermined period, the operating-system server SV1 transmits to IP telephone terminal T11 a message to the effect that registration cannot be accepted, that is, a "Terminal deletion" message (FIG. 7 (8)).

The license authentication code has a validity period. The operating-system server SV1 updates the license authentication code before the validity period has expired and transmits the updated license authentication code to IP telephone terminal T11 (FIG. 7 (9)). As for the update of the license authentication code, the operating-system server SV1 may transmit the license authentication code to IP telephone terminal T11. Alternatively, IP telephone terminal T11 may send an update request signal and the operating-system server SV1, having received the request signal, may transmit the updated license authentication code to IP telephone terminal T11.

IP telephone terminal T11 stores the license authentication code and issue time information sent from the operating-system server SV1 in the license authentication code storage module 531 by overwriting the previous code and information and informs the operating-system server SV1 of the completion of license authentication code reception (FIG. 7 (10)).

Thereafter, when a failure has occurred in the operating-system server SV1 for some reason, IP telephone terminal T11 detects the failure and transmits a REGISTER message, or a "terminal registration request," to the standby-system server SV2 (FIG. 7 (11)).

The standby-system server SV2 compares the terminal identifier included in the REGISTER message sent from IP telephone terminal T11 with the terminal identifier stored in the license information table 271, thereby performing license authentication (block ST72a). In this case, since terminal identifier "2000" of IP telephone terminal T11 has not been registered in the license information table 271 (No), the standby-system server SV2 transmits a license authentication code request to IP telephone terminal T11 (FIG. 7 (12)).

Then, IP telephone terminal T11 reads, in response to the request, the license authentication code and issue time information stored in the license authentication code storage module 531 and transmits the license authentication code and issue time information to the standby-system server SV2 (FIG. 7 (13)).

Having received the license authentication code and issue time information from IP telephone terminal T11, the standby-system server SV2 checks whether the issue time has exceeded a predetermined time (block ST72b). If the issue time has not exceeded the predetermined time (Yes), the standby-system server SV2 causes the terminal identifier of IP telephone terminal T11 and the system ID included in the license authentication code to correspond to each other and registers them in the terminal registration table 273 and sends back ACK, or a "terminal registration response" signal, to IP telephone terminal T11 (FIG. 7 (14)).

In block ST72b, if a license authentication code has not been sent in response to the request even when a predetermined time has elapsed, or if the issue time of the sent license authentication code has exceeded a predetermined period, the operating-system server SV2 transmits to IP telephone terminal T11 a message to the effect that registration cannot be accepted, or a "Terminal deletion" message (FIG. 7 (15)). In response to this, IP telephone terminal T11 sends back to the standby-system server SV2 a response message to the effect that terminal T11 has received the "Terminal deletion" message (FIG. 7 (16)).

When, for example, a request for use of "Voice mail apparatus" has arrived from IP telephone terminal T11, the standby-system server SV2 refers to system ID "12345" corresponding to terminal identifier "2000" of IP telephone terminal T11 stored in the terminal registration table 273 and further refers to the service execution table 272 using the system ID as a key to determine whether "Voice mail apparatus" has been set to "Usable." If it has been set to "Usable," use of "Voice mail apparatus" is permitted.

Using such an approach causes IP telephone terminal T11 to be connected to the standby-system server SV2, enabling use of IP telephone terminal T11 even if license information has not been input to the standby-system server SV2.

In addition, after having registered IP telephone terminal T11, the standby-system server SV2 checks the validity period of the license authentication code periodically. If having determined that the validity period of the license authentication code has expired, the standby-system server SV2 transmits "Terminal deletion notice" to IP telephone terminal T11. Then, the registration of IP telephone terminal T11 is deleted from the standby-system server SV2, disabling IP telephone terminal T11 from communicating. Therefore, even when a person attempts to use a terminal illegally by using a license authentication code, the attempt can be prevented.

(When an Authentication Code Includes Issue Time and Validity Period)

At the time of startup, IP telephone terminal T11 transmits a REGISTER message to the operating-system server SV1 at regular intervals. Having received the REGISTER message, the operating-system server SV1 registers the terminal identifier included in the REGISTER message in the license information table 271 of the HDD 27.

When having received a REGISTER message from IP telephone terminal T11, the operating-system server SV1 determines whether the terminal identifier included in the REGISTER message coincides with the terminal identifier in the license information table 271. If the former coincides with the latter, the operating-system server SV1 sends back ACK, or a "terminal registration response" signal, to IP telephone terminal T11. At the same time, as shown in FIG. 9, the operating-system server SV1 not only creates a license authentication code (license authentication basic information) by combining an instruction code for making active a function or a hardware circuit corresponding to system ID "12345" in the service execution table 272 with the system ID, but also adds issue time information corresponding to the registration time of IP telephone terminal T11 and license validity period information indicating the validity period of the license to the license authentication code. Then, the operating-system server SV1 transmits to IP telephone terminal T11 the license authentication code to which the issue time information and license validity period information have been added.

IP telephone terminal T11 stores the license authentication code, issue time information, and license validity period information sent from the operating-system server SV1 into the license authentication code storage module 531 and informs the operating-system server SV1 of the completion of the license authentication code reception. This completes the registration of IP telephone terminal T11 in the operating-system server SV1.

If the terminal identifier included in the REGISTER message does not coincide with the terminal identifier in the license information table 271, the operating-system server SV1 transmits a license authentication code request to IP telephone terminal T11 that has requested registration. If in response to this request, IP telephone terminal T11 has sent a license authentication code to which the issue time information and license validity period information have been added, the operating-system server SV1 checks whether the issue time has exceeded the license validity period. If the issue time has not exceeded the validity period, the operating-system server SV1 causes the terminal identifier of IP telephone terminal T11 and the system ID included in the license authentication code to correspond to each other and registers them in the terminal registration table 273 and sends back ACK, or a "terminal registration response" signal, to IP telephone terminal T11.

If a license authentication code has not been sent in response to the request even when a predetermined time has elapsed, or if the issue time of the sent license authentication code has exceeded the license validity period, the operating-system server SV1 transmits to IP telephone terminal T11 a message to the effect that registration cannot be accepted, that is, a "Terminal deletion" message.

Thereafter, when a failure has occurred in the operating-system server SV1 for some reason, IP telephone terminal T11 detects the failure and transmits a REGISTER message, or a "terminal registration request," to the standby-system server SV2.

The standby-system server SV2 compares the terminal identifier included in the REGISTER message sent from IP telephone terminal T11 with the terminal identifier stored in the license information table 271, thereby performing license authentication. In this case, since terminal identifier "2000" of IP telephone terminal T11 has not been registered in the license information table 271, the standby-system server SV2 transmits a license authentication code request to IP telephone terminal T11.

Then, IP telephone terminal T11 reads, in response to the request, the license authentication code, issue time information, and license validity period information stored in the license authentication code storage module 531 and transmits the code, time information, and period information to the standby-system server SV2.

Having received the license authentication code, issue time information, and license validity period information from IP telephone terminal T11, the standby-system server SV2 checks whether the issue time has exceeded the license validity period. If the issue time has not exceeded the license validity period, the standby-system server SV2 causes the terminal identifier of IP telephone terminal T11 and the system ID included in the license authentication code to correspond to each other and registers them in the terminal registration table 273 and sends back ACK, or a "terminal registration response" signal, to IP telephone terminal T11.

If a license authentication code has not been sent in response to the request even when a predetermined time has elapsed, or if the issue time of the sent license authentication code has exceeded the license validity period, the operating-system server SV2 transmits to IP telephone terminal T11 a message to the effect that registration cannot be accepted, or a "Terminal deletion" message. In response to this, IP telephone terminal T11 sends back to the standby-system server SV2 a response message to the effect that terminal T11 has received the "Terminal deletion" message.

(When an Authentication Code Includes a Validity Period)

At the time of startup, IP telephone terminal T11 transmits a REGISTER message to the operating-system server SV1 at regular intervals. Having received the REGISTER message, the operating-system server SV1 registers the terminal identifier included in the REGISTER message in the license information table 271 of the HDD 27.

When having received the REGISTER message from IP telephone terminal T11, the operating-system server SV1 determines whether the terminal identifier included in the REGISTER message coincides with the terminal identifier in the license information table 271. If the former coincides with the latter, the operating-system server SV1 sends back ACK, or a "terminal registration response" signal, to IP telephone terminal T11. At the same time, as shown in FIG. 10, the operating-system server SV1 not only creates a license authentication code (license authentication basic information) by combining an instruction code for making active a function or a hardware circuit corresponding to system ID "12345" in the service execution table 272 with the system ID, but also adds license validity period information indicating the validity period of the license to the license authentication code. Then, the operating-system server SV1 transmits the license-validity-period-information-added license authentication code to IP telephone terminal T11.

IP telephone terminal T11 stores the license authentication code and license validity period information sent from the operating-system server SV1 into the license authentication code storage module 531 and informs the operating-system server SV1 of the completion of the license authentication code reception. This completes the registration of IP telephone terminal T11 in the operating-system server SV1.

If the terminal identifier included in the REGISTER message does not coincide with the terminal identifier in the license information table 271, the operating-system server SV1 transmits a license authentication code request to IP telephone terminal T11 that has requested registration. If in response to this request, IP telephone terminal T11 has sent the license-validity-period-information-added license authentication code, the operating-system server SV1 checks whether the current time measured by a timer (not shown) has exceeded the license validity period. If the present time has not exceeded the validity period, the operating-system server SV1 causes the terminal identifier of IP telephone terminal T11 and the system ID included in the license authentication code to correspond to each other and registers them in the terminal registration table 273 and sends back ACK, or a "terminal registration response" signal, to IP telephone terminal T11.

If a license authentication code has not been sent in response to the request even when a predetermined time has elapsed, or if the current time measured by the timer has exceeded the license validity period in the sent license authentication code, the operating-system server SV1 transmits to IP telephone terminal T11 a message to the effect that registration cannot be accepted, that is, a "Terminal deletion" message.

Thereafter, when a failure has occurred in the operating-system server SV1 for some reason, IP telephone terminal T11 detects the failure and transmits a REGISTER message, or a "terminal registration request," to the standby-system server SV2.

The standby-system server SV2 compares the terminal identifier included in the REGISTER message sent from IP telephone terminal T11 with the terminal identifier stored in the license information table 271, thereby performing license authentication. In this case, since terminal identifier "2000" of IP telephone terminal T11 has not been registered in the license information table 271, the standby-system server SV2 transmits a license authentication code request to IP telephone terminal T11.

Then, IP telephone terminal T11 reads, in response to the request, the license authentication code and license validity period information stored in the license authentication code storage module 531 and transmits the code and period information to the standby-system server SV2.

Having received the license authentication code and license validity period information from IP telephone terminal T11, the standby-system server SV2 checks whether the current time measured by the timer (not shown) is within the license validity period. If the current time is within the validity period, the standby-system server SV2 causes the terminal identifier of IP telephone terminal T11 and the system ID included in the license authentication code to correspond to each other and registers them in the terminal registration table 273 and sends back ACK, or a "terminal registration response" signal, to IP telephone terminal T11.

If a license authentication code has not been sent in response to the request even when a predetermined time has elapsed, or if the current time measured by the timer has exceeded the license validity period in the license authentication code, the operating-system server SV2 transmits to IP telephone terminal T11 a message to the effect that registration cannot be accepted, or a "Terminal deletion" message. In response to this, IP telephone terminal T11 sends back to the standby-system server SV2 a response message to the effect that terminal T11 has received the "Terminal deletion" message.

As described above, with the first embodiment, when IP telephone terminal T11 is registered in the operating-system server SV1, the operating-system server SV1 causes the terminal identifier of IP telephone terminal T11 and the system ID of the license authentication code issued to IP telephone terminal T11 to correspond to each other and stores them in the license information table 271 of the operating-system server SV1. At the same time, the operating-system server SV1 transmits an issue-time-information-added license authentication code to IP telephone terminal T11 that has requested registration. Then, IP telephone terminal T11 requesting registration stores the issue-time-information-added license authentication code in the license authentication code storage module 531.

If the operating-system server SV1 should have functioned abnormally, IP telephone terminal T11 transmits not only a terminal registration request but also the issue-time-information-added license authentication code held in the license authentication code storage module 531 to the standby-system server SV2. Based on the issue time information, the standby-system server SV2 causes the terminal identifier and the system ID of the license authentication code to correspond to each other and stores them in the terminal registration table 273, thereby enabling an arbitrary function or hardware circuit to be used continuously based on the system ID of the license authentication code stored in the terminal registration table 273.

Therefore, only the license registration of IP telephone terminals T11 to T1n in the operating-system server SV1 makes unnecessary the license registration of them in the standby-system server SV2. Should a failure has occurred in the operating-system server SV1 in which IP telephone terminals T11 to T1n have been registered, they are newly registered in the standby-system server SV2, which enables IP telephone terminal T11 to use an arbitrary function or hardware circuit continuously.

In addition, the standby-system server SV2 can check whether IP telephone terminal T11 requesting registration is an authorized terminal, based on the issue time information added to the license authentication code. This enables an erroneous terminal registration or an illegal terminal registration to be prevented even if another user has stolen a license authentication code for another telephone terminal purposely.

Furthermore, with the first embodiment, the standby-system server SV2 can check whether IP telephone terminal T11 requesting registration is using an expired function or hardware circuit, based on the issue time information and license validity period information added to the license authentication code. This prevents the user from using an old function or an old hardware circuit indefinitely. In addition, even if another user has stolen a license authentication code for another telephone terminal purposely, an erroneous terminal registration or an illegal terminal registration can be prevented.

Moreover, with the first embodiment, the standby-system server SV2 can check whether IP telephone terminal T11 requesting registration is using an expired function or hardware circuit, based on only the license validity period information added to the license authentication code. This prevents the user from using an old function or an old hardware circuit indefinitely. In addition, even if another user has stolen a license authentication code for another telephone terminal purposely, an erroneous terminal registration or an illegal terminal registration can be prevented.

Second Embodiment

A second embodiment is such that a standby-system server permits an unlicensed IP telephone terminal to use only a specific communication service without rejecting registration.

Figure 11:
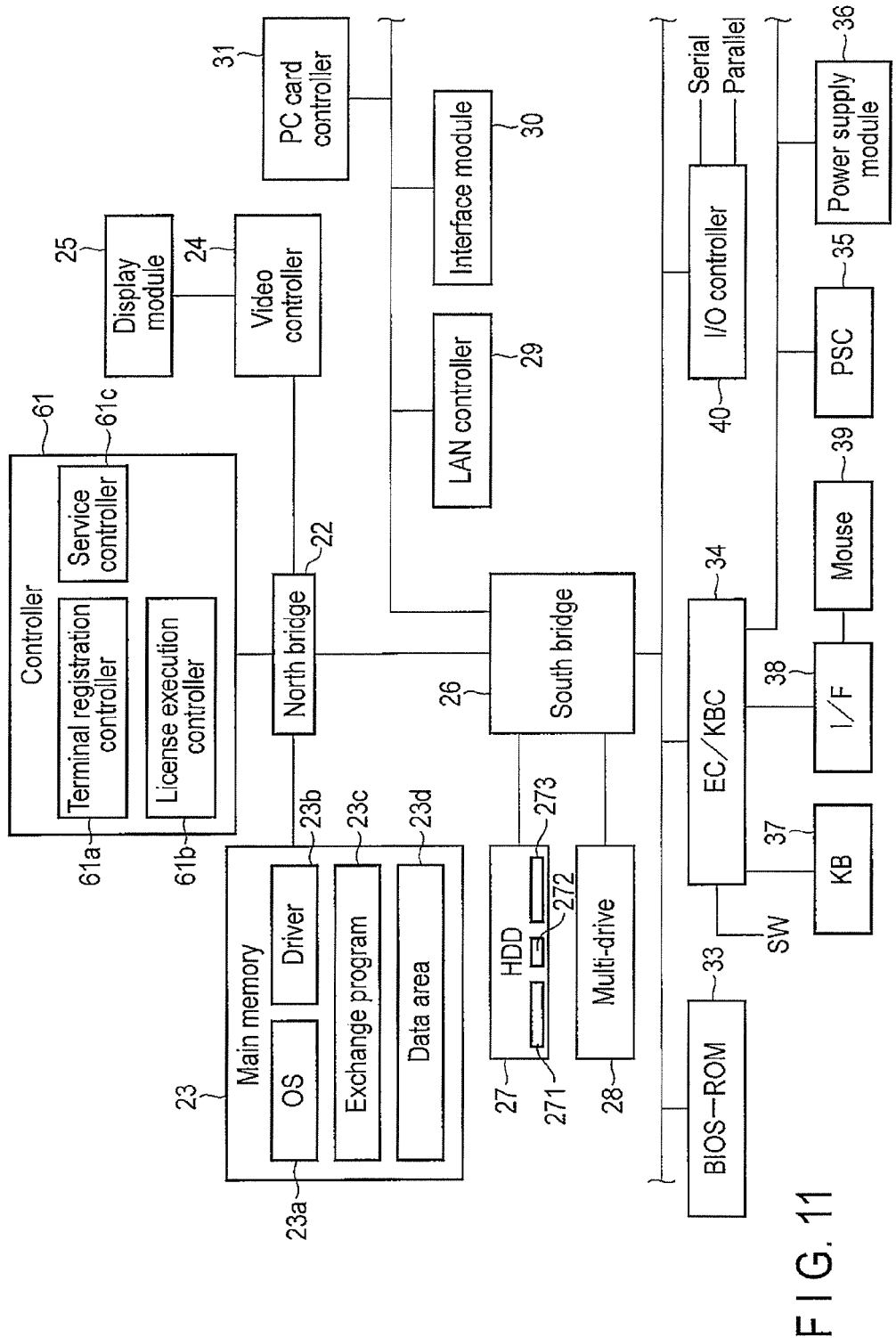
FIG. 11 is a block diagram showing the configuration of a standby-system server according to a second embodiment.

FIG. 11 is a block diagram showing the configuration of a standby-system server SV2 according to the second embodiment. In FIG. 11, the same parts as those of FIG. 6 are indicated by the same reference numerals and a detailed explanation will be omitted.

The controller 61 is newly provided with a service controller 61c. The service controller 61c permits a IP telephone terminal refused registration in the terminal registration table 273 by the terminal registration controller 61a, for example, IP telephone terminal T14, to use a communication service using a previously specified function or hardware circuit. For example, the communication service includes an emergency outgoing call service.

Next, the operation of the above configuration will be explained.

FIG. 12 shows a sequence to explain the operation of transmitting and receiving information between the operating-system server SV1, the standby-system server SV2, and IP telephone terminal T11 in registering a terminal.

When a failure has occurred in the operating-system server SV1 for some reason, IP telephone terminal T11 detects the failure and transmits a REGISTER message, or a "terminal registration request," to the standby-system server SV2 (FIG. 12 (1)).

The standby-system server SV2 compares the terminal identifier included in the REGISTER message sent from IP telephone terminal T11 with the terminal identifier stored in the license information table 271, thereby performing license authentication (block ST122a). In this case, since the terminal identifier "2000" of IP telephone terminal T11 has not been registered in the license information table 271 (No), the standby-system server SV2 transmits a license authentication code request to IP telephone terminal T11 (FIG. 12 (2)).

Then, IP telephone terminal T11 reads, in response to the request, the license authentication code, issue time information, and license validity period information stored in the license authentication code storage module 531 and transmits them to the standby-system server SV2 (FIG. 12 (3)).

Having received the license authentication code, issue time information, and license validity period information from IP telephone terminal T11, the standby-system server SV2 checks whether the issue time has exceeded the license validity period (block ST122b). If the issue time has not exceeded the validity period (Yes), the standby-system server SV2 causes the terminal identifier of IP telephone terminal T11 and the system ID included in the license authentication code to correspond to each other and registers them in the terminal registration table 273 and sends back ACK, or a "terminal registration response" signal, to IP telephone terminal T11 (FIG. 12 (4)).

In block ST122*b*, if a license authentication code has not been sent in response to the request even when a predetermined time has elapsed, or if the issue time of the sent license authentication code has exceeded the license validity period, the operating-system server SV2 adds a flag representing unlicensed to the terminal identifier of IP telephone terminal T11 requesting registration and registers the flag-added terminal identifier in the terminal registration table 273.

For example, if the user of IP telephone terminal T11 has made an outgoing call to an external telephone terminal on the public network (FIG. 12 (5)), IP telephone terminal T11 sends an outgoing call request to the standby-system server SV2 (FIG. 12 (6)).

Having received the outgoing call request, the standby-system server SV2 refers to the terminal registration table 273 based on terminal identifier "2000" included in the outgoing call request. When the reference result has shown that a flag representing unlicensed has been added to terminal identifier "2000," the standby-system server SV2 sends back to source IP telephone terminal T11 a "Service refusal" message to the effect that communication service cannot be accepted (FIG. 12 (7)).

Suppose, for example, the user of IP telephone terminal T11 has made an emergency outgoing call by dialing, for example, "110" to perform urgent notification (FIG. 12 (8)). Then, IP telephone terminal T11 sends the emergency outgoing call request to the standby-system server SV2 (FIG. 12 (9)).

When having received the emergency outgoing call request, the standby-system server SV2 analyzes the dial number of the destination included in the emergency outgoing call request and, based on the analysis result, determines whether the request is for urgent notification (FIG. 12 (10)). In this case, since the request is an outgoing call request for urgent notification, the standby-system server SV2 calls an urgent notification destination and sends back to IP telephone terminal T11 a message to the effect that the service has been accepted (FIG. 12 (11)).

When the urgent notification destination has responded to the call, the standby-system server SV2 connects IP telephone terminal T11 with the urgent notification destination. Therefore, the user of IP telephone terminal T11 can make an emergency call to the urgent notification destination.

As described above, with the second embodiment, even if, for example, the license authentication code of IP telephone terminal T11 has expired, the standby-system server SV2 permits IP telephone terminal T11 to make, for example, an urgent call, making it unnecessary to wait until the malfunctioning operating-system server SV1 has been brought back into good condition, which improves user-friendliness.

Other Embodiments

While in the above embodiments, the embodiments have been applied to a redundant configuration including the operating system and the standby system, it may be applied to a multi-server configuration in using a terminal by moving to another server.

In addition, a first and a second server need not be separated physically. A plurality of virtual servers may be configured on a single physical server.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A telephone system comprising:

a plurality of telephone terminals;

a first server apparatus configured to register the telephone terminals; and a second server apparatus configured to function as a standby system for the first server apparatus, the first server apparatus comprising a license memory configured to store a terminal ID in association with a license authentication code, wherein the terminal ID corresponds with the telephone terminal, wherein the license authentication code is code for permitting the use of at least one of a plurality of functions or a plurality of hardware circuits or for expanding a capacity, wherein the plurality of functions or a plurality of hardware circuits are concerned with exchange processing between the telephone terminals;

a license setting module configured to set a corresponding function or hardware circuit to be usable/unusable in the telephone terminal based on the license authentication code stored in the license memory, a license authentication module configured to perform license authentication by comparing a terminal ID included in a registration request with a terminal ID stored in the license memory when the registration request is transmitted from any one of the telephone terminals, and a transmission controller configured to read from the license memory a license authentication code corresponding to a telephone terminal whose terminal ID coincides with that stored in the license memory, and transmit to the telephone terminal a license authentication code added check information, wherein the check information is information for checking that the code is valid, and the telephone terminal comprising an authentication code memory configured to store check information and a license authentication code sent from the first server apparatus, and a server switching controller configured to transmit to the second server apparatus a registration request and a license authentication code and check information stored in the authentication code memory when a failure has occurred in the first server apparatus in which the telephone terminal is registered, and the second server apparatus comprising a registration controller configured to store in a management table the terminal ID in association with the license authentication code or reject the storing in the management table the terminal ID in association with the license authentication code based on the check information added to the license authentication code sent from the telephone terminal when the telephone terminal send a registration request, and a service controller configured to set a corresponding function or hardware circuit usable/unusable in the telephone terminal to use the corresponding function or hardware circuit continuously for the first server apparatus, based on a license authentication code stored in the management table.

2. The telephone system of claim 1, wherein the transmission controller adds registration time information as the check information to the license authentication code and transmits the resulting license authentication code to the telephone terminal, and the registration controller stores in the management table the terminal ID in association with the license authentication code, if the registration time information added to the license authentication code sent from the telephone terminal is within a predetermined period, and rejects the storing in the management table the terminal ID in association with the license authentication code, if the registration time information has exceeded the predetermined period.

3. The telephone system of claim 1, wherein the transmission controller adds registration time information and validity period information on the license authentication code as the check information to the license authentication code and transmits the resulting license authentication code to the telephone terminal, and the registration controller stores in the management table the terminal ID in association with the license authentication code if the registration time information added to the license authentication code sent from the telephone terminal is within a validity period, and rejects the storing in the management table the terminal ID in association with the license authentication code, if the registration time information has exceeded the validity period.

4. The telephone system of claim 1, wherein the transmission controller adds validity period information on the license authentication code as the check information to the license authentication code and transmits the resulting license authentication code to the telephone terminal, and the registration controller stores in the management table the terminal ID in association with the license authentication code, if the current time is within the validity period added to the license authentication code sent from the telephone terminal and rejects the storing in the management table the terminal ID in association with the license authentication code, if the current time has exceeded the validity period.

5. The telephone system of claim 1, wherein the second server apparatus further comprises a service allocation module configured to permit a telephone terminal to use a communication service using a previously specified function or hardware circuit, wherein the telephone terminal is terminal for which the registration controller has rejected the storing in the management table the terminal ID in association with the license authentication code.

6. A server apparatus registering a plurality of telephone terminals, the server apparatus comprising:

a license memory configured to store a terminal ID in association with a license authentication code, wherein the terminal ID corresponds with the telephone terminal, wherein the license authentication code is code for permitting the use of at least one of a plurality of functions or a plurality of hardware circuits or for expanding a capacity, wherein the plurality of functions or a plurality of hardware circuits are concerned with exchange processing between the telephone terminals;

a license setting module configured to set a corresponding function or hardware circuit to be usable/unusable in the telephone terminal based on the license authentication code stored in the license memory;

a license authentication module configured to perform license authentication by comparing a terminal ID included in a registration request with a terminal ID stored in the license memory when the registration request is transmitted from any one of the telephone terminals;

a transmission controller configured to read from the license memory a license authentication code corresponding to a telephone terminal whose terminal ID coincides with that stored in the license memory, and transmit to the telephone terminal a license authentication code added check information, wherein the check information is information for checking that the code is valid;

a registration controller configured to store in a management table the terminal ID in association with the license authentication code or reject the storing in the management table the terminal ID in association with the license authentication code based on check information when a telephone terminal whose terminal ID do not coincide with that stored in the license memory send the license authentication code and the check information; and a service controller configured to set a corresponding function or hardware circuit usable/unusable in the telephone terminal to use the corresponding function or hardware circuit continuously for a second server apparatus, based on a license authentication code stored in the management table.

7. The server apparatus of claim 6, wherein the transmission controller adds registration time information as the check information to the license authentication code and transmits the resulting license authentication code to the telephone terminal, and the registration controller stores in the management table the terminal ID in association with the license authentication code, if the registration time information added to the license authentication code sent from the telephone terminal is within a predetermined period, and rejects the storing in the management table the terminal ID in association with the license authentication code, if the registration time information has exceeded the predetermined period.

8. The server apparatus of claim 6, wherein the transmission controller adds registration time information and validity period information on the license authentication code as the check information to the license authentication code and transmits the resulting license authentication code to the telephone terminal, and the registration controller stores in the management table the terminal ID in association with the license authentication code, if the registration time information added to the license authentication code sent from the telephone terminal is within a validity period, and rejects the storing in the management table the terminal ID in association with the license authentication code, if the registration time information has exceeded the validity period.

9. The server apparatus of claim 6, wherein the transmission controller adds validity period information on the license authentication code as the check information to the license authentication code and transmits the resulting license authentication code to the telephone terminal, and the registration controller stores in the management table the terminal ID in association with the license authentication code, if the current time is within the validity period added to the license authentication code sent from the telephone terminal, and rejects the storing in the management table the terminal ID in association with the license authentication code, if the current time has exceeded the validity period.

10. The server apparatus of claim 6, further comprising a service allocation module configured to permit a telephone terminal to use a communication service using a previously specified function or hardware circuit, wherein the telephone terminal is terminal for which the registration controller has rejected the storing in the management table the terminal ID in association with the license authentication code.

11. A control method used in a telephone system comprising a plurality of telephone terminals, a first server apparatus registering the telephone terminals and including a license memory configured to store a terminal ID in association with a license authentication code, and a license setting module configured to set a corresponding function or hardware circuit to be usable/unusable in the telephone terminal based on the license authentication code stored in the license memory; and a second server apparatus functioning as a standby system for the first server apparatus, the control method comprising:

causing the first server apparatus to
perform license authentication by comparing a terminal ID included in a registration request with a terminal ID stored in the license memory when the registration request is transmitted from any one of the telephone terminals, and
read from the license memory a license authentication code corresponding to a telephone terminal whose terminal ID coincides with that stored in the license memory and transmit to the telephone terminal a license authentication code added check information, wherein the check information is information for checking that the code is valid, causing the telephone terminal to
store check information and a license authentication code sent from the first server apparatus in an authentication code memory, and
transmit to the second server apparatus a registration request and the license authentication code and check information stored in the authentication code memory when a failure has occurred in the first server apparatus, and causing the second server apparatus to
store in a management table the terminal ID in association with the license authentication code or reject the storing in the management table the terminal ID in association with the code, based on check information added to the license authentication code sent from the telephone terminal when the telephone terminal is send a registration request, and
set a corresponding function or hardware circuit usable/unusable in the telephone terminal to use the corresponding function or hardware circuit continuously for the first server apparatus, based on the license authentication code stored in the management table.

12. The control method of claim 11, wherein the causing the first server apparatus to transmit to the telephone terminal comprises causing the first server apparatus to add registration time information as the check information to the license authentication code and transmit the resulting license authentication code to the telephone terminal, and the causing the second server apparatus to store the terminal ID and the license authentication code comprises causing the second server to store in the management table the terminal ID in association with the license authentication code if the registration time information added to the license authentication code sent from the telephone terminal is within a predetermined period, and, reject the storing in the management table the terminal ID in association with the license authentication code, if the registration time information has exceeded the predetermined period.

13. The control method of claim 11, wherein the causing the first server apparatus to transmit to the telephone terminal comprises causing the first server apparatus to add registration time information and validity period information on the license authentication code as the check information to the license authentication code and transmit the resulting license authentication code to the telephone terminal, and the causing the second server apparatus to store the terminal ID and the license authentication code comprises causing the second server to store in the management table the terminal ID in association with the license authentication code, if the registration time information added to the license authentication code sent from the telephone terminal is within a validity period, and reject the storing in the management table the terminal ID in association with the license authentication code, if the registration time information has exceeded the validity period.

14. The control method of claim 11, wherein the causing the first server apparatus to transmit to the telephone terminal comprises causing the first server apparatus to add validity period information on the license authentication code as the check information to the license authentication code and transmit the resulting license authentication code to the telephone terminal, and the causing the second server apparatus to store the terminal ID and the license authentication code comprises causing the second server to store in the management table the terminal ID in association with the license authentication code, if the current time is within the validity period added to the license authentication code sent from the telephone terminal, and reject the storing in the management table the terminal ID in association with the license authentication code, if the current time has exceeded the validity period.

15. The control method of claim 11, wherein the second server apparatus comprises permitting a telephone terminal to use a communication service using a previously specified function or hardware circuit, wherein the telephone terminal is terminal for which the registration controller has rejected the storing in the management table the terminal ID in association with the license authentication code.

* * * * *